United States Patent
Deshpande et al.

(10) Patent No.: US 10,148,672 B2
(45) Date of Patent: Dec. 4, 2018

(54) DETECTION OF ROGUE ACCESS POINT

(71) Applicant: Samsung Electronics Co., Ltd., Suwon-si, Gyeonggi-do (KR)

(72) Inventors: Swapnil D. Deshpande, Atlanta, GA (US); Trevor J. Davenport, Berkekley, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/664,289

(22) Filed: Mar. 20, 2015

(65) Prior Publication Data

US 2016/0277427 A1    Sep. 22, 2016

(51) Int. Cl.
*H04L 29/06* (2006.01)
*H04W 12/12* (2009.01)

(52) U.S. Cl.
CPC ......... *H04L 63/1416* (2013.01); *H04W 12/12* (2013.01)

(58) Field of Classification Search
CPC . H04L 63/1408; H04L 63/1441; H04L 63/10; H04L 63/1416; H04L 63/102; H04W 12/12
USPC .......................................................... 726/4
See application file for complete search history.

(56) References Cited

U.S. PATENT DOCUMENTS

| | | | | |
|---|---|---|---|---|
| 2005/0058292 A1* | 3/2005 | Diorio | .................. | G06K 7/0008 380/270 |
| 2006/0153153 A1* | 7/2006 | Bhagwat | .................. | H04K 3/65 370/338 |
| 2007/0186276 A1* | 8/2007 | McRae | ................ | H04L 63/1408 726/4 |
| 2008/0052779 A1* | 2/2008 | Sinha | .................. | H04L 63/1441 726/22 |
| 2010/0031029 A1* | 2/2010 | Ilyadis | .................. | H04L 9/3271 713/156 |
| 2012/0134272 A1 | 5/2012 | Vempati et al. | | |

(Continued)

OTHER PUBLICATIONS

Sachin R. Sonawane, et al.; "A Survey on Evil Twin Detection Methods for Wireless Local Area Network"; International Journal of Computer Engineering & Technology; vol. 4, Issue 2, Mar.-Apr. 2013; pp. 493-499.

(Continued)

*Primary Examiner* — Ashokkumar B Patel
*Assistant Examiner* — William B Jones (57) ABSTRACT

A method and apparatus determine whether a rogue access point (AP) is present within a wireless network. The method includes sending a first AP discovery message including a pre-stored identifier of a known AP previously accessed by a UE; sending one or more additional AP discovery messages, each additional message including a generated identifier of a non-existent AP; and receiving responses to the first and additional AP discovery messages. Additionally, the method includes determining whether a rogue AP is present within a wireless network of the UE based on the responses indicating that one or more non-existent APs are present within the wireless network. The method may also include determining to connect to the known AP based on the responses indicating that known AP is present and no non-existent AP is present within the wireless network of the UE.

20 Claims, 5 Drawing Sheets

(56) References Cited

U.S. PATENT DOCUMENTS

2014/0140331 A1* 5/2014 Lee .................. H04L 63/10
370/338
2015/0063205 A1 3/2015 Elliott

OTHER PUBLICATIONS

Ankit Panch, et al.; "A Novel approach for Evil Twin or Rogue AP mitigation in wireless environment"; International Journal of Security and Its Applications; vol. 4, No. 4; Oct. 2010; pp. 33-38.
Harold Gonzales, et al.; "Practical Defenses for Evil Twin Attacks in 802.11"; http://www.cs.gmu.edu/~mccoy/papers/gonzales-globecom10.pdf; 6 pages.
Extended European Search Report dated May 3, 2016 in connection with European Application No. 16158441.2, 8 pages.

* cited by examiner

DETECTION OF ROGUE ACCESS POINT

TECHNICAL FIELD

This disclosure relates generally to wireless network security. More specifically, this disclosure relates to detection of rogue access points (APs).

BACKGROUND

Wireless local area networks (WLANs) provide Internet access using WiFi which is implemented using the IEEE 802.11 specification. This specification is implemented in nearly every tablet, phone, and laptop device on the market. User equipment (UE) seeking network connections broadcast probes looking for previously-used wireless APs to connect to and provide network access.

Network security problems may exist as a result of rogue APs. Rogue APs are APs that impersonate a previously accessed AP. For example, a rogue AP may receive the broadcast probe looking for the previously-used APs and respond by indicating that the rogue AP is the previously-used AP. Upon connection of the UE to the rogue AP impersonating the previously-used AP, the rogue AP can capture and maliciously use the data transmitted to and from the UE. For example, a user's browsing history, passwords, credit card information, etc. may be vulnerable to interception.

Rogue APs may be devices that implement the WiFi Pineapple specification or Pineapple devices. WiFi Pineapple was originally designed to help security researchers conduct penetration testing in an unobtrusive manner. However, WiFi Pineapple may be exploited by hackers as discussed above. Rogue APs may also be called fake APs, imposter APs, or malicious APs.

SUMMARY

This disclosure provides detection of rogue access points.

In one exemplary embodiment, a method for detecting an AP is provided. The method includes sending a first AP discovery message including a pre-stored identifier of a known AP previously accessed by a UE. The method also includes sending one or more additional AP discovery messages, each additional message including a generated identifier of a non-existent AP. The method includes receiving responses to the first and additional AP discovery messages. Additionally, the method includes determining whether a rogue AP is present within a wireless network of the UE based on the responses indicating that one or more non-existent APs are present within the wireless network of the UE.

In another exemplary embodiment, an apparatus for detecting an AP is provided. The apparatus includes a transceiver and at least one processor. The transceiver is configured to send a first AP discovery message including a pre-stored identifier of a known AP previously accessed by the UE; send one or more additional AP discovery messages, each additional message including a generated identifier of a non-existent AP; and receive responses to the first and additional AP discovery messages. The at least one processor configured to determine whether a rogue AP is present within a wireless network of the UE based on the responses indicating that one or more non-existent APs are present within the wireless network of the UE.

In yet another exemplary embodiment, a non-transitory computer readable medium embodying a computer program for detecting an AP is provided. The computer program comprising program code that when executed causes at least one processor to cause a transceiver to send a first AP discovery message including a pre-stored identifier of a known AP previously accessed by a user equipment (UE); cause a transceiver to send one or more additional AP discovery messages, each additional message including a generated identifier of a non-existent AP; identify received responses to the first and additional AP discovery messages; and determine whether a rogue AP is present within a wireless network of the UE based on the responses indicating that one or more non-existent APs are present within the wireless network of the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Embodiments of the present disclosure recognize that techniques for detecting rogue APs include monitoring connections to a database, checking a list of known malicious IP addresses, and maintaining a track of legitimate sessions. Embodiments of the present disclosure recognize that other available techniques include constraining APs by trusted locations and crowd-sourcing-based reporting protocols. However, embodiments of the present disclosure recognize and take into account that such techniques may fail to stop the initial malicious connection to the rogue AP and that post-connection based techniques may not prevent information sent out by the UE from being intercepted by the rogue AP. Accordingly, embodiments of the present disclosure provide apparatuses and methods for determining whether a rogue AP is present within a wireless network while attempting to connect to an AP.

Figure 1:
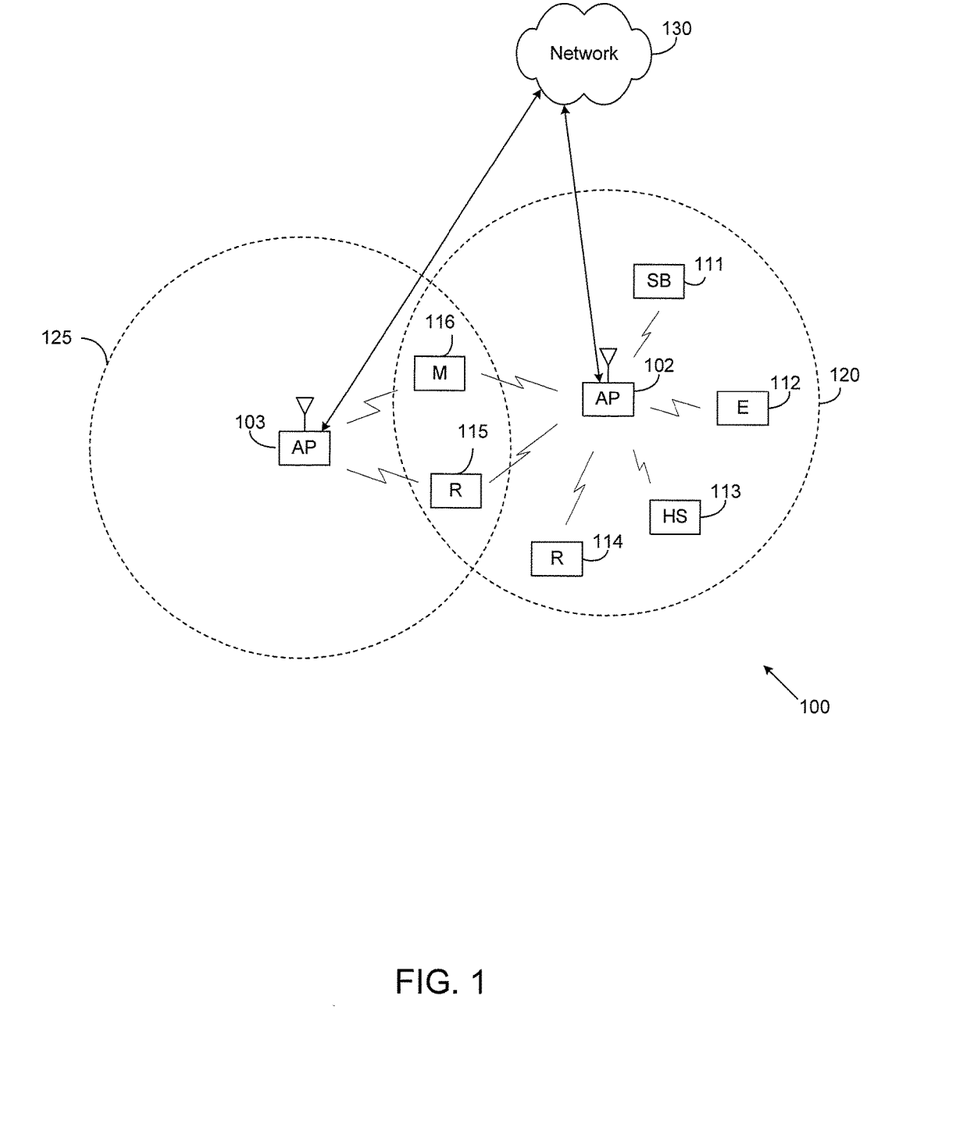
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an AP 102 and an AP 103. The APs 102 and 103 communicate with at least one network 130, such as the Internet, a proprietary Internet Protocol (IP) network, or other data network.

The AP 102 provides wireless broadband access to the network 130 for a first plurality of user equipment (UEs) within a coverage area 120 of the AP 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), like a cell phone, a wireless laptop, a wireless PDA, or the like. The AP 103 provides wireless broadband access to the network 130 for a second plurality of UEs within a coverage area 125 of the AP 103. The second plurality of UEs includes the UE 115 and the UE 116. In some embodiments, one or more of the APs 102-103 may communicate with each other and with the UEs 111-116 using 5G, LTE, LTE-A, WiMAX, WiFi, WiGig, or other wireless communication techniques.

Depending on the network type, other well-known terms may be used instead of "AP," such as "hotspot," "eNodeB," "base station," etc. For the sake of convenience, the term "AP" is used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an AP, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may be a rogue AP and/or one or more of the UEs may include a program and circuitry for detecting such a rogue AR Although FIG. 1 illustrates one example of a wireless network 100, various changes may be made to FIG. 1. For example, the wireless network 100 could include any number of APs and any number of UEs in any suitable arrangement. Also, the AP 102 could communicate directly with any number of UEs and provide those UEs with wireless broadband access to the network 130. Similarly, each AP 102-103 could communicate directly with the network 130 and provide UEs with direct wireless broadband access to the network 130. Further, the APs 102 and/or 103 could provide access to other or additional external networks, such as external telephone networks or other types of data networks.

Figure 2:
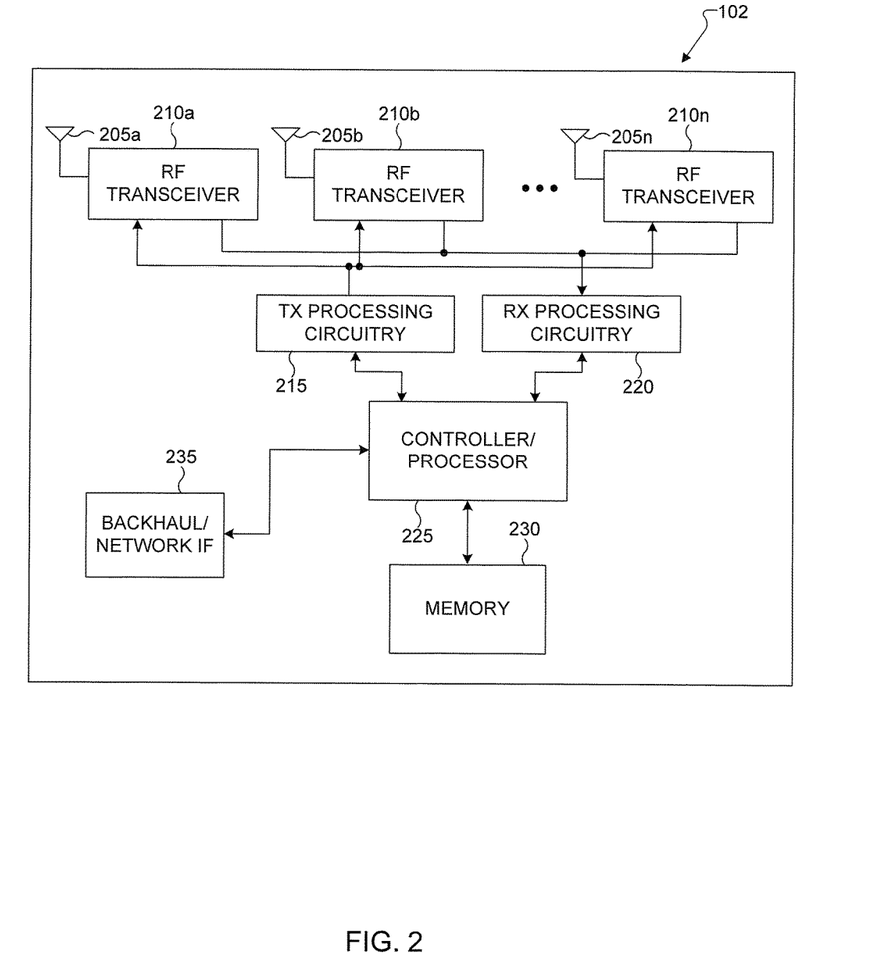
FIG. 2 illustrates an example access point according to this disclosure.

FIG. 2 illustrates an example AP 102 according to this disclosure. The embodiment of the AP 102 illustrated in FIG. 2 is for illustration only, and the AP 103 of FIG. 1 could have the same or similar configuration. However, APs come in a wide variety of configurations, and FIG. 2 does not limit the scope of this disclosure to any particular implementation of an AP.

As shown in FIG. 2, the AP 102 includes multiple antennas 205a-205n, multiple RF transceivers 210a-210n, transmit (TX) processing circuitry 215, and receive (RX)

processing circuitry 220. The AP 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100 in FIG. 1. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the AP 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the AP 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the AP 102 to communicate with other devices or systems over a backhaul connection or over a network. The interface 235 could support communications over any suitable wired or wireless connection(s). For example, when the AP 102 is implemented as part of a cellular communication system (such as one supporting 5G, LTE, or LTE-A), the interface 235 could allow the AP 102 to communicate with other APs over a wired or wireless backhaul connection. When the AP 102 is implemented as an AP, the interface 235 could allow the AP 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, one or more of the AP 102 may be a rogue AP seeking to gain information from a UE or an AP previously accessed by a UE. Although FIG. 2 illustrates one example of AP 102, various changes may be made to FIG. 2. For example, the AP 102 could include any number of each component shown in FIG. 2. As a particular example, an AP could include a number of interfaces 235, and the controller/processor 225 could support routing functions to route data between different network addresses. As another particular example, while shown as including a single instance of TX processing circuitry 215 and a single instance of RX processing circuitry 220, the AP 102 could include multiple instances of each (such as one per RF transceiver). Also, various components in FIG. 2 could be combined, further subdivided, or omitted, and additional components could be added according to particular needs.

Figure 3:
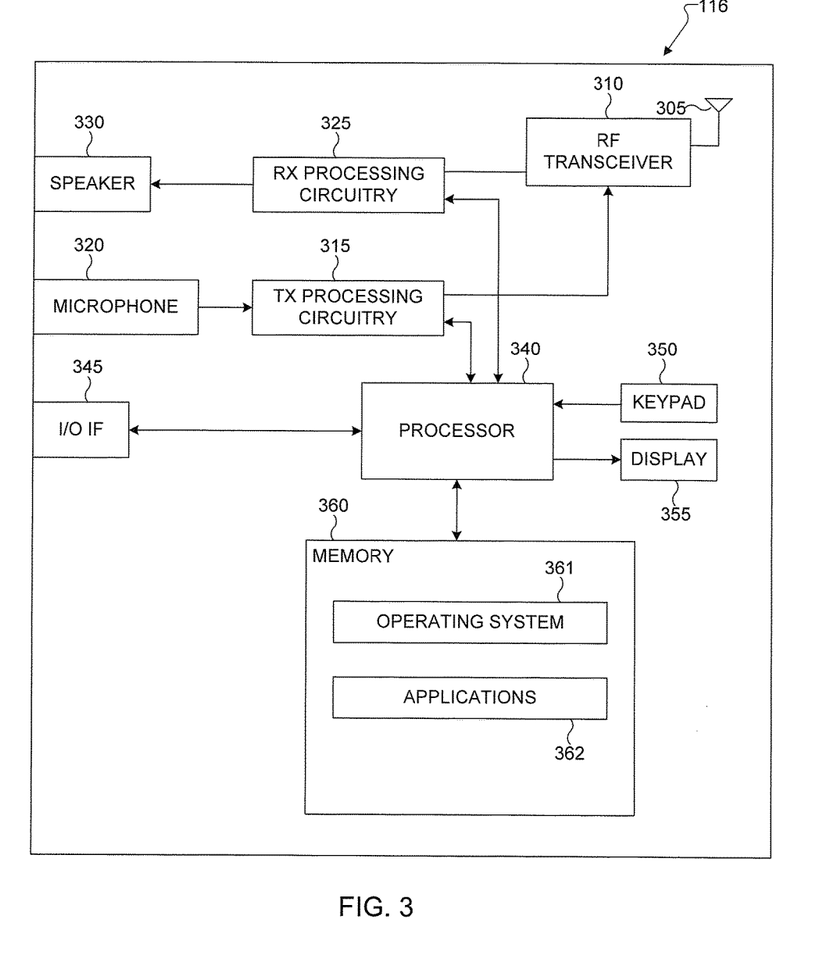
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, a keypad 350, a display 355, and a memory 360. The memory 360 includes an operating system (OS) 361 and one or more applications 362.

The RF transceiver 310 receives, from the antenna 305, an incoming RF signal transmitted by an AP of the network 100 in FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from APs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the keypad 350 and the display 355. The operator of the UE 116 can use the keypad 350 to enter data into the UE 116. The display 355 may be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 may include a program and circuitry for detecting a rogue AP and/or determining whether any rogue APs are present within the wireless network of the UE before connecting to an AP. Although FIG. 3 illustrates one example of UE 116, various changes may be made to FIG. 3. For example, various components in FIG. 3 could be combined, further subdivided, or omitted, and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
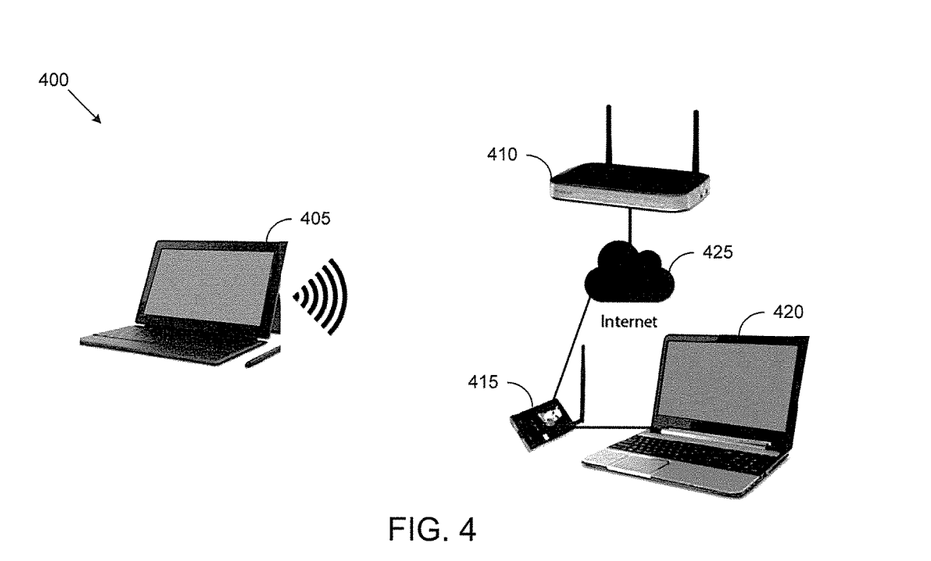
FIG. 4 illustrates an example wireless network including a rogue access point according to this disclosure.

FIG. 4 illustrates an example wireless network 400 including a rogue AP according to this disclosure. Network 400 includes a UE 405 (e.g., the UE 116 in FIG. 1) and APs 410 and 415 (e.g., the APs 102 and/or 103 in FIG. 1). APs 410 and 415 provide wireless access to a network, such as the Internet 425, to UE 405. In this illustrative example, AP 410 is a known AP and/or an AP that the UE 405 has used previously, and AP 415 is a rogue AP that attempts to impersonate APs that the UE 405 requests to connect. For example, the UE 405 may have previously connected to AP 410 and have stored an identifier (e.g., service set identifier (SSID)) of the AP for remembering the AP 410 (and any connection related information) to ease connection at a later time. Rogue AP 415 may be a WiFi Pineapple device or other type of hotspot attempting to impersonate AP 410 to intercept and exploit data transmitted to or from the UE 405 via rogue AP 415. For example, the rogue AP 415 may be connected to a computer 420 of a hacker or other person attempting to intercept user data that is transmitted over WiFi.

Embodiments of the present disclosure use the rogue AP impersonation system against itself. As the rogue AP 415 relies on intercepting broadcast requests, embodiments of the present disclosure use a system of false positives. Embodiments of the present disclosure recognize that some solutions may require some prior computation and/or connecting to a database to determine if the AP 415 is malicious. This may require the UE 405 to perform extra work and, as a result, may slow down normal operations and have an adverse effect on battery life.

In this illustrative embodiment, the UE 405 uses the intrinsic protocols embedded within malicious devices against themselves. The UE 405 generates a combination of one or more random, pseudorandom, known, and targeted (e.g., falsely constructed) identifiers (e.g., SSIDs) when broadcasting AP discovery messages (e.g., WiFi probes). The UE 405 sends a combination of such real and/or fake AP identifiers and then waits for the responses. Rogue AP 415 is interested in connecting with and receiving the data from as many UEs as possible. Thus, the rogue AP 415 will respond affirmatively to all of the AP identifiers. For example, a Pineapple device may respond to the UE WiFi probes with "Yes, I am [Known SSID #1]," "Yes, I am [Fake SSID #2]", "Yes, I am [RANDOM SSID #3]", etc. Since UE 405 controls which SSIDs are broadcast, by using a system of false positives, the UE 405 can detect that a rogue AP is in the wireless area network (e.g., WLAN) of the UE by receiving positive indications from not only multiple known connections in the same location, but also positive indications to falsely-generated SSIDs.

While the above example discusses using both known (real) and UE generated (fake) identifiers, any suitable combination may be used. For example, the UE 405 may broadcast only real identifiers of two or more APs that do not have overlapping cells. For example, the UE 405 may store connection locations of known APs and select at least two that are not close enough to have overlapping network cells. Upon receiving a positive indication of two or more non-overlapping APs, the UE 405 may determine that a rogue AP is present. In another example, the UE 405 may not be attempting to access an AP for network connectivity but may rather be scanning for rogue APs. In this scenario, the UE 405 may broadcast AP discovery requests including only fake (e.g., one or more random, pseudorandom, and/or targeted) identifiers for non-existent APs, and determine that any positive response for a non-existent AP indicates the presence of a rogue AP.

Figure 5:
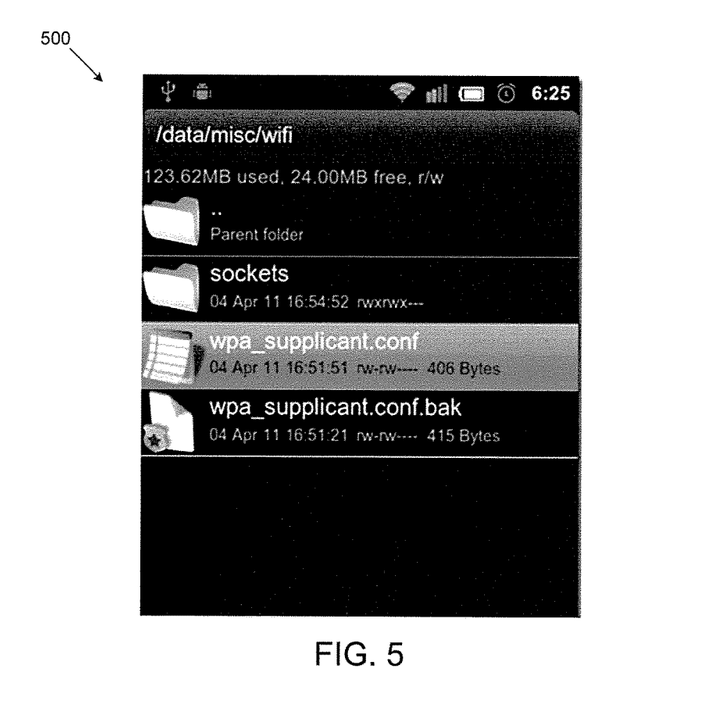
FIG. 5 illustrates an example screen capture for a display of a WiFi menu including an access point detection file according to this disclosure.

FIG. 5 illustrates an example screen capture for a display of a WiFi menu 500 including an AP detection file according to this disclosure. Embodiments of the present disclosure implement the above discussed rogue AP detection techniques into standard AP search and connection procedures. For example, a UE 405 may store a list of identifiers (e.g., SSIDs) for known/previously accessed APs in a WiFi menu file, such as the file named "wpa_supplicant.conf" illustrated in FIG. 5. For AP discovery, the UE 405 broadcasts WiFi probes out periodically (e.g., about every 8 to 15 seconds, depending on whether the WiFi menu is accessed on the UE 405). The broadcast includes the identifier of the AP and an address for the UE 405 (e.g., the media access control (MAC) address). Around the same time as the "real" WiFi probes, the UE 405 may generate and broadcast the "fake" WiFi probes (e.g., probes with UE-generated SSIDs) for rogue AP detection.

In some embodiments, the UE 405 may change the UE address included with the AP discovery requests. For example, the UE 405 may change and/or randomize the MAC address included with the SSID in one or more of the WiFi probes. This is to address the situation where the rogue AP 415 may discover that one UE is broadcasting several SSIDs in probes. In this example, the rogue AP 415 will be under the impression different devices are requesting different APs and will subsequently be detectable.

Figure 6:
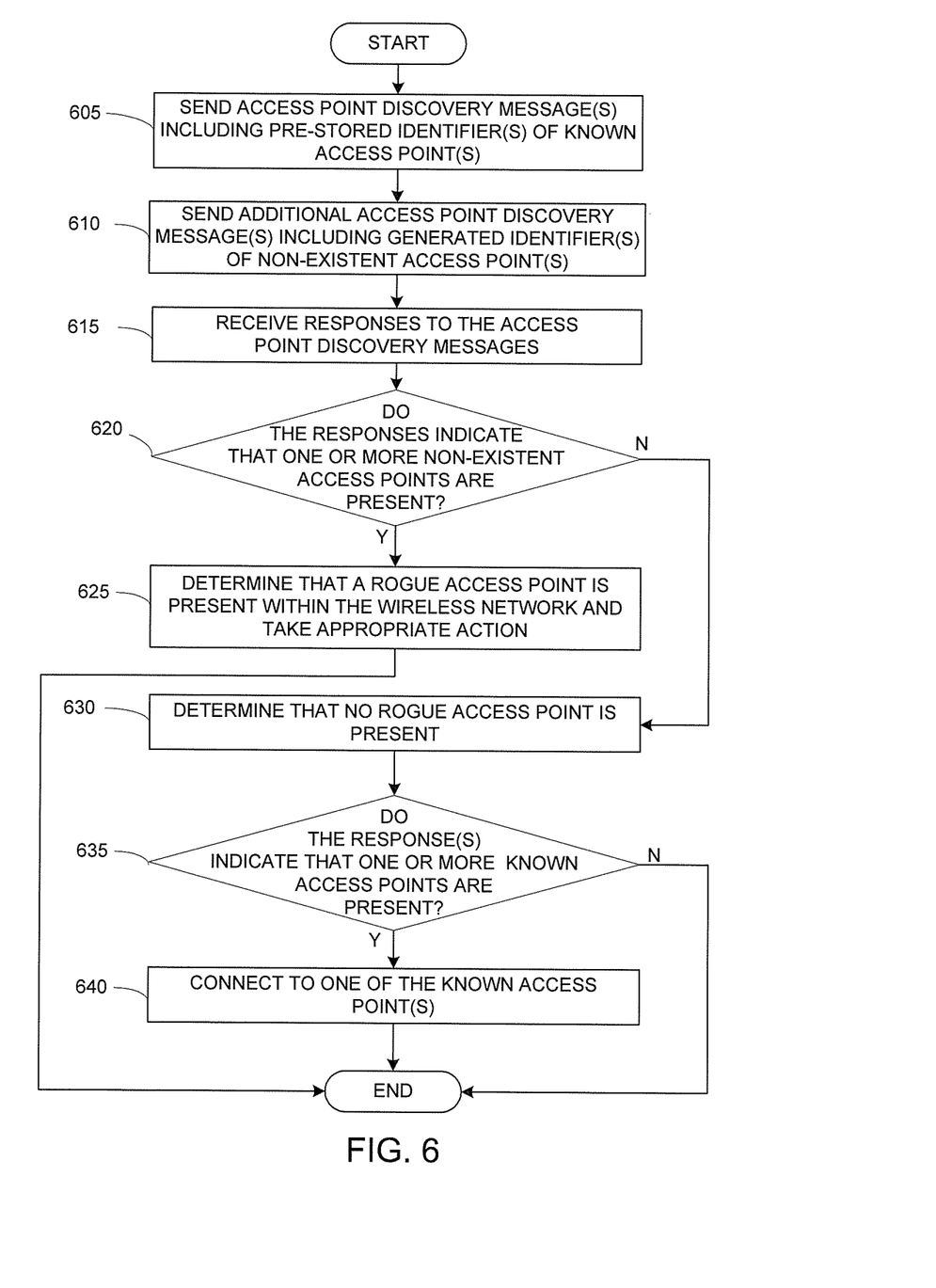
FIG. 6 illustrates an example process for determining whether a rogue access point is present within a wireless network while attempting to connect to an access point according to this disclosure.

FIG. 6 illustrates an example process for determining whether a rogue AP is present within a wireless network while attempting to connect to an AP according to this disclosure. The process illustrated in FIG. 6 may be performed by the UE 405 in FIG. 4.

The process begins with the UE sending AP discovery message(s) including pre-stored identifier(s) of known AP(s) (step 605). For example, in step 605, the UE may store a list of one or more previously-accessed APs for ease of reconnection. The UE may send WiFi probes with SSIDs of the one or more previously-accessed APs. In embodiments where the UE is only looking to detect rogue APs and is not interested in connecting to an AP, the UE may not perform this step.

The UE then sends additional AP discovery message(s) including generated identifier(s) of non-existent AP(s) (step 610). For example, in step 610, the UE may generate one or more random identifiers and/or one or more random identifiers of fake or non-existent APs. In these embodiments, the UE may send any combination of real and/or fake discovery messages in any order. In some embodiments, the UE may modify and/or randomize the UE's address of what is included in any of the AP discovery messages such that one or more of the first and additional AP discovery messages include different sender addresses to avoid the rogue AP "wising up" to the detection scheme.

The UE receives responses to the AP discovery messages (step 615). The UE then determines whether the responses indicate that one or more non-existent APs are present (step 620). For example, in step 620, the UE may determine whether the responses indicate that multiple previously-accessed APs are responding as present in the same area and/or the UE may determine that the responses indicate that one or more APs corresponding to UE generated fake identifiers are claiming to be present within the wireless network of the UE.

If the responses indicate that one or more non-existent APs are present, the UE determines that a rogue AP is present within the wireless network and takes appropriate action(s) (step 625), with the process terminating thereafter. In one example, in step 625, the UE may attempt to connect to the rogue AP and send data using secured communication techniques. For example, the UE may send encrypted data and request responses of encrypted data. In another example, the UE reporting the presence of the rogue AP may determine not to connect to the known AP. For example, the UE may display a message to a user that a rogue AP is detected and/or may report the existence of the rogue AP to an appropriate authority (e.g., report to a database for tracking rogue AP activity). If the UE is only interested in rogue AP detection, the process may end here. The process may also be repeated to continue to monitor for the presence or absence of rogue APs within the wireless area network of the UE.

If the responses indicate that one or more non-existent APs are not present, the UE determines that no rogue AP is present (step 630). For example, in step 630, the UE may not receive a positive response to any of the fake identifiers. The UE then determines whether response(s) indicate that one or more known APs are present (step 635). For example, in step 635, the UE may determine whether previously-used APs are available for connections. If the response(s) indicate that one or more known APs are present, the UE connects to one of the known AP(s) (step 640). For example, in step 640, the UE may connect and receive network access via the AP, with the process terminating thereafter. If the known APs do not respond, the UE may not connect to an AP and may repeat the process for attempting connection periodically.

Although FIG. 6 illustrates an example process for determining whether a rogue AP is present within a wireless network while attempting to connect to an AP, respectively, various changes could be made to FIG. 6. For example, while shown as a series of steps, various steps in each figure could overlap, occur in parallel, occur in a different order, or occur multiple times. Moreover, some of the steps may be omitted, for example, if the UE is only interested in rogue AP detection.

Although the present disclosure has been described with exemplary embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for detecting an access point (AP), the method comprising:
   sending, by a user equipment (UE), a first AP discovery message including a pre-stored identifier of a known AP previously accessed by the UE;
   sending one or more additional AP discovery messages, each additional message including a generated identifier of a non-existent AP;
   receiving responses to the first AP discovery message and the one or more additional AP discovery messages, wherein the responses to the one or more additional AP discovery messages include an indication that an identifier of a sender of the responses matches the generated identifier of the non-existent AP; and
   determining, by the UE, that a rogue AP is present within a wireless network of the UE based on the responses indicating that one or more non-existent APs are present within the wireless network of the UE.

2. The method of claim 1, further comprising determining to connect to the known AP based on the responses indicating that known AP is present and no non-existent AP is present within the wireless network of the UE.

3. The method of claim 1, further comprising in response to determining that a rogue AP is present within the wireless network of the UE, connecting to the known AP, and sending data using encrypted communication.

4. The method of claim 1, further comprising in response to determining that the rogue AP is present within the wireless network of the UE, reporting the presence of the rogue AP and determining not to connect to the known AP.

5. The method of claim 1, further comprising:
   generating one or more random identifiers and one or more pseudorandom identifiers of non-existent APs; and
   including the generated one or more random and pseudorandom identifiers in the one or more additional AP discovery messages.

6. The method of claim 1, further comprising modifying an address of the UE that is included in one or more of the first AP discovery message and the one or more additional AP discovery messages such that one or more of the first AP discovery message and the one or more additional AP discovery messages include different sender addresses.

7. The method of claim 1, wherein the first AP discovery message and the one or more additional AP discovery messages are WiFi probes and the pre-stored and generated identifiers are service set identifiers (SSIDs).

8. An apparatus in a user equipment (UE) detecting an access point (AP), the apparatus comprising:
   a transceiver configured to:

send a first AP discovery message including a pre-stored identifier of a known AP previously accessed by the UE;
send one or more additional AP discovery messages, each additional message including a generated identifier of a non-existent AP; and
receive responses to the first AP discovery message and the additional AP discovery messages, wherein the responses to the one or more additional AP discovery messages include an indication that an identifier of a sender of the responses matches the generated identifier of the non-existent AP; and
at least one processor configured to determine that a rogue AP is present within a wireless network of the UE based on the responses indicating that one or more non-existent APs are present within the wireless network of the UE.

9. The apparatus of claim 8, wherein the at least one processor is configured to determine to connect to the known AP based on the responses indicating that known AP is present and no non-existent AP is present within the wireless network of the UE.

10. The apparatus of claim 8, wherein the at least one processor is configured to, in response to determining that a rogue AP is present within the wireless network of the UE, cause the UE to connect to the known AP and the transceiver to send data using encrypted communication.

11. The apparatus of claim 8, wherein the at least one processor is configured to, in response to determining that the rogue AP is present within the wireless network of the UE, cause at least one of the transceiver and a display to report the presence of the rogue AP and to determine not to connect the UE to the known AP.

12. The apparatus of claim 8, wherein the at least one processor is configured to:
generate one or more random identifiers and one or more pseudorandom identifiers of non-existent APs; and
cause the transceiver to include the generated one or more random and pseudorandom identifiers in the one or more additional AP discovery messages.

13. The apparatus of claim 8, wherein the at least one processor is configured to modify an address of the UE that is included in one or more of the first AP discovery message and the one or more additional AP discovery messages such that one or more of the first AP discovery message and the one or more additional AP discovery messages include different sender addresses.

14. The apparatus of claim 8, wherein the first AP discovery message and the one or more additional AP discovery messages are WiFi probes and the pre-stored and generated identifiers are service set identifiers (SSIDs).

15. A non-transitory computer readable medium embodying a computer program for detecting an access point (AP), the computer program comprising program code that when executed causes at least one processor to:
cause a transceiver to send a first AP discovery message including a pre-stored identifier of a known AP previously accessed by a user equipment (UE);
cause a transceiver to send one or more additional AP discovery messages, each additional message including a generated identifier of a non-overlapping AP;
receive, via the transceiver, responses to the first AP discovery message and the one or more additional AP discovery messages, wherein the response indicate a presence of non-overlapping APs; and
determine that a rogue AP is present within a wireless network of the UE based on the responses indicating that one or more non-overlapping APs are present within the wireless network of the UE.

16. The computer readable medium of claim 15, the computer program further comprising program code that when executed causes at least one processor to determine to connect to the known AP based on the responses indicating that known AP is present and no non-overlapping AP is present within the wireless network of the UE.

17. The computer readable medium of claim 15, the computer program further comprising program code that when executed causes at least one processor to, in response to determining that a rogue AP is present within the wireless network of the UE, connect the UE to the known AP, and cause a transceiver to send data using encrypted communication.

18. The computer readable medium of claim 15, the computer program further comprising program code that when executed causes at least one processor to, in response to determining that the rogue AP is present within the wireless network of the UE, cause at least one of a transceiver and a display to report the presence of the rogue AP and to determine not to connect the UE to the known AP.

19. The computer readable medium of claim 15, the computer program further comprising program code that when executed causes at least one processor to:
generate one or more random identifiers and one or more pseudorandom identifiers of non-existent APs; and
cause a transceiver to include the generated one or more random and pseudorandom identifiers in the one or more additional AP discovery messages.

20. The computer readable medium of claim 15, the computer program further comprising program code that when executed causes at least one processor to modify an address of the UE that is included in one or more of the first AP discovery message and the one or more additional AP discovery messages such that one or more of the first AP discovery message and the one or more additional AP discovery messages include different sender addresses.

* * * * *

UNITED STATES PATENT AND TRADEMARK OFFICE
CERTIFICATE OF CORRECTION

PATENT NO.        : 10,148,672 B2
APPLICATION NO.   : 14/664289
DATED             : December 4, 2018
INVENTOR(S)       : Swapnil D. Deshpande and Trevor J. Davenport Page 1 of 1

It is certified that error appears in the above-identified patent and that said Letters Patent is hereby corrected as shown below:

On the Title Page

Item (54) and in the Specification, Column 1, Line 1, delete "DETECTION OF ROGUE ACCESS POINT" and insert --DETECTION OF ROGUE ACCESS POINTS--.

Signed and Sealed this
Tenth Day of December, 2019

Andrei Iancu
*Director of the United States Patent and Trademark Office*